(12) United States Patent
Wallach et al.

(10) Patent No.: US 7,349,860 B1
(45) Date of Patent: Mar. 25, 2008

(54) INSURANCE INCENTIVE PROGRAM HAVING A TERM OF YEARS FOR PROMOTING THE PURCHASE OR LEASE OF AN AUTOMOBILE

(75) Inventors: Robert Wallach, Mill Neck, NY (US); Jasper Jackson, Montclair, NJ (US)

(73) Assignee: Creative Innovators Associates, LLC, Bethpage, NY (US)

( * ) Notice: Subject to any disclaimer, the term of this patent is extended or adjusted under 35 U.S.C. 154(b) by 142 days.

(21) Appl. No.: 09/645,794

(22) Filed: Aug. 24, 2000

(51) Int. Cl.
*G06Q 40/00* (2006.01)
(52) U.S. Cl. .................................. 705/4; 705/35; 705/1
(58) Field of Classification Search .................... 705/4, 705/35, 36, 38, 39, 1; 235/400, 384, 379, 235/380
See application file for complete search history.

(56) References Cited

U.S. PATENT DOCUMENTS

| | | | | |
|---|---|---|---|---|
| 5,797,134 | A * | 8/1998 | McMillan et al. | 705/400 |
| 5,950,169 | A * | 9/1999 | Borghesi et al. | 705/4 |
| 6,233,563 | B1 * | 5/2001 | Jefferson et al. | 705/4 |
| 6,304,859 | B1 * | 10/2001 | Ryan et al. | 705/38 |
| 6,347,302 | B1 * | 2/2002 | Joao | 705/4 |
| 6,363,360 | B1 * | 3/2002 | Madden | 705/37 |
| 6,449,597 | B1 * | 9/2002 | McGill | 705/1 |
| 2002/0116228 | A1 * | 8/2002 | Bauer et al. | 705/4 |

OTHER PUBLICATIONS

Getting a handle on commercial automobile costs; Risk Management; New York; Mar. 1995; Vendetti, James G; vol. 42; pp. 1-4.*
Ford plans to test no-hassle car lease; Phil West The Associated Press; The Commercial Appeal; Nemphis Tenn; Sep. 26, 199 pp. 1-2.*
(Fixed-Rate Mortgage Still Popular by Ruth Richey. Richmond Times- Dispatch. Richmond, VA, Mar. 16, 1986; p. J-3).*
Life cycle of a net-leased property by (Cline, Leonard A. Real Estate Review. New YORK: 1997. vol. 27, Iss.3; p. 34, 5 pgs).*
Yamaha to get insurance plan OK'D by Jan. 1, Orange County Business Journal, p. 4; Dec. 2, 1990.*
Lease, Buy or Reimburse Outside Sales Vehicles by Battersby, Mark E. Agency Sales. Irvine: Oct. 1986. vol. 16, Iss. 10; p. 55, 3 pgs.*
"Geico Faces Challenges After Grabbing Market Share", J. Cahill, The Wall Street Journal, Jan. 27, 2000.
"Equifax Corp. Posts An Increase of 39% In Quarterly Profit", The Wall Street Journal, Jan. 26, 2000.
"We've put on a lot, without piling on the pounds", advertising for 306 Peugeot Source, date unknown.
"Cars Direct Learns Rules of the Road", Automotive News, Nov. 22, 1999.

(Continued)

*Primary Examiner*—Zeender Ryan Florian
*Assistant Examiner*—Vanel Frenel
(74) *Attorney, Agent, or Firm*—Chadbourne & Parke LLP; Walter G. Hanchuk (57) ABSTRACT

Included in the payment of a financing amount corresponding to a loan or a lease of an item, such as an automobile, is a payment representing a portion of an insurance premium amount for an insurance policy having a term co-extensive with the term of the lease or the loan. The payment may be arranged for or completed over a computer network, such as the Internet.

21 Claims, 6 Drawing Sheets

OTHER PUBLICATIONS

"IIAA Strongly Objecting to Direct Sales Program the Hartford Has Entered With Ford Motor Company" Source, date unknown.
"Schrempp defends D/C's mild grain for 2$^{nd}$ quarter" date unknown.
"If you're looking for a reason to buy an Alfa 145, Here's 4", Automobile Advertisement; Source, date unknown.
"Chrysler: Record 1$^{st}$ Quarter pro-fit", R. Kisiel and J. Henry, Automotive News Apr. 13, 1998.
"£84.99 a month, three year's free servicing and one year's free insurance. Remember to wipe the ink off your face when you kiss the page", Hyandai Advertisment; Source, date unknown.
"The 1999 Ford Feature Models" advertising from Ford, date unknown.
"We've summed up the Citroën Saxo in two words" advertising from "Citroën Saxo", Citroen Saxo Advertisement.
"Get the Figure You've Always Dreamed of", Renault advertisement; source, date unknown.
"Pearly Queens in London?" advertising from Rover; source, date unknown.
"Ford Must Rebuild Europe Market Share" The Wall Street Journal Jan. 26, 2000.
"Toyota flexes finance arm", James B. Treece, Automotive News, Nov. 20, 1998.
"Performance Insurance Direct", advertisement; Source, date unknown.
"Porsche Motor Insurance" Porsche Club Approved, advertisement Source, date unknown.
"BMW Financial-Chubb: The ultimate marketing machine", finance & Insurance Oct. 25, 1999.
"Daimler Chrysler Struggles to Fix Image After Stock Slides on Earning Report", The Wall Street Journal Aug. 2, 1997.
"D/C use rebates to hold line in van market" Automotive News, Ralph Kisiel, Dec. 6, 1999.
"Ford Coupons offer F-series discounts" Automotive News, Mary Connelly, Nov. 22, 1999.
"The real cost of new cars: more than you think", Autoweek, Aug. 16, 1999.
"Car payments haven't grown but they do live longer" Source, date unknown.
"Ford Credit eyes 10% earnings gain", Finance and Insurance; date unknown.
"Key Reasons to Protect Your Automobiles With Chubb" Source, date unknown.
"D/C Ads Wave Five Star Dealer Flag", Automotive News, Sep. 20, 1999, Dave Gailford.
"BMW Program Puts New Soul in Body Shops", Automotive News, Arleva Sawyers Sep. 7, 1998.
"Study: Certified used cars worth more", Arlena Sawyers, Automotive News, Dec. 6, 1999.
"Poll: Future bright for used autos" Frank S. Washington, Automotive News Feb. 8, 1998.
"GM modifies certified used vehicle plan" Arlena Sawyers, Automotive News, Dec. 6, 1999.
"D/C Minivans get big changes under the skin" Michael Woodyard and Ralph Kisiel, Jan. 2000.
"Comeback Kids: Minivans post big sales gains in first quarter" John K. Teahen Jr., Automotive News, Apr. 19, 1999.
"D/C tries to rescue smart project", Automotive News, Dorothee Ostle Apr. 26, 1999.
"CITRONEN", Advertisement, Evening Standard London Jul. 2, 1999.
"Network Q Quality Used Cars", Advanced Economics, Vauxhall, date unknown.
"Choice 1.2..3 Calculated to Impress", Advanced Economics, advertisement; Source, date unknown.
"Young buyers seek honestly, not glitz", Jean Halliday, Automotive news Nov. 1, 1999.

* cited by examiner

Retailer Receives Indication of Make and Model of Automobile Subject to a Sales Incentive Provided By a Manufacturer    202

Retailer Enters Into Sales Agreement With Qualified Buyer    204

Retailer Confirms Qualification Of Buyer Based On Make and Model of Automobile    206

Retailer Confirms Provision of Insurance if Sale or Lease is Qualified    208

INSURANCE INCENTIVE PROGRAM HAVING A TERM OF YEARS FOR PROMOTING THE PURCHASE OR LEASE OF AN AUTOMOBILE

CROSS-REFERENCE TO RELATED APPLICATIONS

This application is related to co-pending U.S. patent application Ser. No. 09/645,020 entitled "Insurance Incentive Program for Promoting the Purchase or Lease of an Automobile" filed on Aug. 23, 2000, and is further related to co-pending U.S. patent application Ser. No. 09/645,795 entitled "Insurance Incentive Program for Promoting the Purchase or Re-Lease of an Automobile After an Expiration of a Lease" filed on Aug. 24, 2000, both assigned to the assignee of the present invention, the entirety of each being incorporated herein by reference.

FIELD OF THE INVENTION

The present invention is directed generally to sales incentive programs, and more particularly to sales incentive programs in which insurance is provided to the buyer for an item subject to sale or lease, such as an automobile, wherein the term of the insurance is co-extensive with a financing period or lease period relating to the sale.

BACKGROUND OF THE INVENTION

It is common for manufacturers or retailers to provide incentives to potential purchasers or lessees in order to increase the sale of an item. Particularly with respect to the sale of automobiles, manufacturers have offered lowered interest rates on financing, rebates and extended warranties in an attempt to increase sales of one or more classes of automobile.

One problem faced by potential purchasers or lessees of automobiles is the ability to obtain affordable insurance. Typically, prior to the completion of a sale or lease of an automobile, the purchaser/lessee must secure automobile insurance. An insurer or other party may require a deposit on the insurance ranging from 10-25% of the premium for the policy. This may pose a substantial burden on purchasers/lessees and the costs may affect their decision to purchase or lease an automobile. Even if the purchaser/lessee proceeds with the automobile transaction, the purchaser/lessee faces the prospect of paying separate bills for the loan or lease and the insurance premium, as separate entities usually provide the automobile and the insurance. Furthermore, the insurance premium may change every 6 months or year, at the discretion of the insurance provider, based on the insurer's costs of doing business, changes in underwriting exposure and the like.

Accordingly, it would be advantageous to provide a method of providing insurance which addresses certain of these problems.

SUMMARY OF THE INVENTION

The present application is directed to particular features of a system and method of offering an incentive to purchase or lease an automobile by underwriting and issuing insurance which is co-extensive with a length of the loan or the lease and wherein the insurance premium is paid as a part of a periodic payment due for the loan or the lease.

In particular, one aspect of the invention includes method for billing a flat, recurring charge to a buyer for financing and insurance after a sale of an item, performed by a financial agent. In this embodiment, the financial agent receives a first indication of a sale or lease of an item to a buyer, a second indication of an insurance premium and a financial balance owed by the buyer corresponding to the sale or lease, and a third indication of a predetermined time in which the financial balance is to be paid. The financial agent then calculates a periodic recurring amount based on the insurance premium, the financial balance and the predetermined time and receives, from the buyer, a single payment corresponding to the periodic recurring amount within the predetermined time.

In a second embodiment of the present invention, a method for billing a recurring amount to a buyer covering financing and insurance after a sale of an item is performed by a financial agent. The financial agent receives a first indication of a sale or lease of an item to a buyer, a financial balance owed for the item and a predetermined time in which the financial balance is to be paid. The financial agent further receives a second indication of an insurance premium owed for an insurance policy covering the item for at least a portion of the predetermined time. The financial agent then pays the insurance premium on behalf of the buyer; and calculates a periodic recurring amount for at least a portion of the predetermined time, the periodic recurring amount including a first amount corresponding to the financial balance and a second amount corresponding to the insurance premium. The financial agent then receives, from the buyer, a payment corresponding to the periodic recurring amount within the predetermined time.

According to a third embodiment of the present invention, a method for promoting the sale of an item is performed by a retailer or manufacturer. The retailer or manufacturer provides to a purchaser or lessee a first indication of an item for sale or lease, a second indication of a predetermined time to pay a financial balance corresponding to the item, and a third indication of an offer to charge a periodic recurring amount corresponding to a first payment of an insurance premium and a second payment of a financing amount corresponding to the item. The insurance premium corresponds to an insurance policy covering the item and the periodic payment recurs for at least a portion of the predetermined time.

According to a fourth embodiment of the present invention, a method for receiving an insurance premium for an insurance policy covering an item is performed by an insurance agent. The agent receives a first indication of an item to be covered under an insurance policy, a second indication of a buyer of the item and a third indication of a predetermined time in which the buyer must pay a financial balance corresponding to the item. The financial balance corresponds to a loan amount or a lease amount. The insurance agent then calculates an insurance premium for the entire predetermined time based on the item and the buyer and receives, from a party other than the buyer, a payment of the insurance premium.

According to a fifth embodiment of the present invention, a method for simultaneously paying a financial loan and insurance corresponding to an item is performed by a purchaser or lessee. The purchaser or lessee purchases or leases an item, such as an automobile from a retailer. The item has a corresponding finance amount and an insurance premium amount. The finance amount corresponds to a loan payment or a lease payment and is payable over a predetermined time corresponding to the term of the loan or lease.

The insurance premium amount corresponds to an insurance policy having a term substantially equal to the term of the loan or the lease. The purchaser or lessee then submits a payment corresponding to the recurring amount for at least a portion of the finance amount and a portion of the insurance premium amount within the term.

According to further embodiments of the present invention, the item being purchased or leased may be an automobile of a particular make and model. The insurance policy may cover comprehensive, collision, personal injury, medical costs, property damage, uninsured motorist coverage and/or other types of losses relating to the item. The financed amount and the insurance premium may include a charge for interest. The interest rate for the finance amount may further be substantially equal to the interest rate charged for the insurance premium.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

According to various embodiments of the present invention, an improved incentive program is introduced for promoting the sale of an item. As used herein, the terms "sale," "sell," "selling," "sold," "buy" and "buying" refer to any of a purchase of an item, a purchase of an item with financing or a lease of an item. The item may be a product produced by a manufacturer, or any product or service offered for sale by a retailer. Whether the item is purchased or leased, the purchaser or lessee shall be uniformly referred to herein as a "buyer" or "customer."

In preferred embodiments, the item that is sold is an automobile which may be new or used as those terms are understood by one of ordinary skill in the art.

Figure 1:
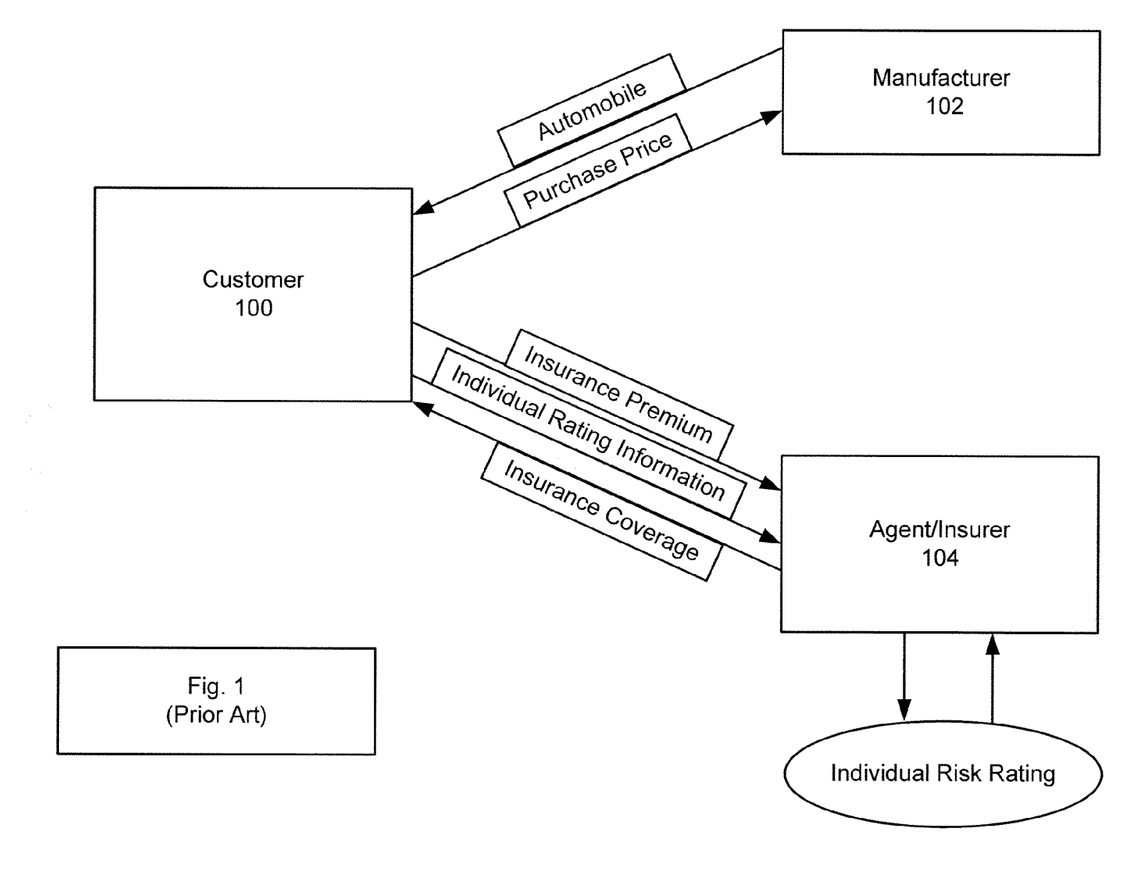
FIG. 1 is a block diagram illustrating an exemplary relationship between manufacturers, retailers, purchasers, insurers, and underwriters of the prior art.

The systems and methods of prior programs are exemplified in FIG. 1. In typical sales of an automobile, a buyer 100 pays a purchase price to a manufacturer 102 for a particular make and model of an automobile offered for sale. The transaction may take place through an intermediary, such as an automobile dealer or an operator of a web site on the Internet (not shown). In consideration of most states' requirements that automobiles have at least minimum insurance coverage, before delivery of the automobile to the buyer can be completed, the buyer 100 must secure an insurance policy for the automobile. This can be accomplished through an automobile dealership working in conjunction with a third party insurer 104, or the buyer may separately obtain insurance coverage from an insurer 104, and provide confirmation thereof, prior to receiving the automobile.

In either event, the insurer 104 will determine an individual risk rating for the buyer 100 based on certain characteristics of the buyer 100. These characteristics typically include all of the following factors: the age of the buyer 100, the sex of the buyer 100, the contemplated usage of the vehicle (business, personal, miles to be driven per day, etc.), the rating territory (broken down by city, state and/or zip code, or any portion thereof) in which the vehicle will be garaged, known risk factors associated with each rating territory (i.e. rate of theft or accident within each rating territory), the driving history of the buyer 100 (i.e. the number of traffic violations and/or accidents in a preceding period of time), the number of persons of legal driving age residing with the buyer 100, and statistics relating to the model of automobile to be purchased (i.e. rate of theft and accidents involving the model).

The buyer 100 will also identify the types of insurance coverage desired for the automobile. Typically, insurers offer six categories of coverage, some of which are mandatory by various state governments. These include: (1) bodily injury liability, for injuries the insured causes to another party; (2) personal injury protection (i.e. no-fault coverage), for medical expenses and lost wages relating to the treatment of injuries to the driver and passengers of the insured's automobile; (3) property damage liability, for damage caused by the insured to another's property; (4) collision coverage, for damage to the insured's car resulting from a collision with another car or object; (5) comprehensive coverage, for damage to the insured's car that doesn't involve a collision (i.e., fire, theft, falling objects, and acts of God); and (6) uninsured motorist coverage, for treatment of an insured's injuries as a result of a collision with an uninsured driver.

Typically, insurance premiums may be discounted based on certain discount factors, such a clean driving and accident record, multiple automobile coverage, automobile coverage in conjunction with other types of insurance (such as home-owners insurance), and safety factors included or added to an automobile, such as air bags, anti-theft devices, use of seat belts and the like.

From the risk factors, the selected insurance coverage and the discount factors, as well as costs and expenses borne by the insurance carrier, an individual premium is calculated by the insurer 104.

The lengthy process of obtaining insurance and the cost of the insurance itself, may be significant to the buyer 100, and may influence the buyer's 104 decision to purchase an automobile. Furthermore, an insurer may require an insurance deposit of 10-25% of the premium at the time of sale to secure an insurance policy for a predetermined period of time, for policies secured with the aid of the retailer. This increases costs to the buyer 100, and again, may impact the decision to purchase the automobile.

Referring now to FIGS. 2-7, wherein similar components of the present invention are referenced in like manner, preferred embodiments of an insurance incentive program for promoting the purchase or lease of an item, such as an automobile, are disclosed.

In general, it is contemplated that a manufacturer 102, or dealers/retailers having a business relationship with the manufacturer, will select a product and promote sales thereof through offering a sales incentive as described herein. In particular, it is contemplated that a manufacturer of automobiles may, based on projected or current sales figures, select one or more makes and models of automobile that are subject to the sales incentive. In order to increase sales of the selected makes and models, the manufacturer 102 may offer a program whereby a qualified buyer would receive an insurance policy with the sale of the automobile, the length of the insurance coverage being co-extensive with the length of a loan or a lease of the item. This incentive may be provided in addition to or in place of offering standard sales incentives such as rebates, lowered financing interest rates and extended warranties.

Figure 2:
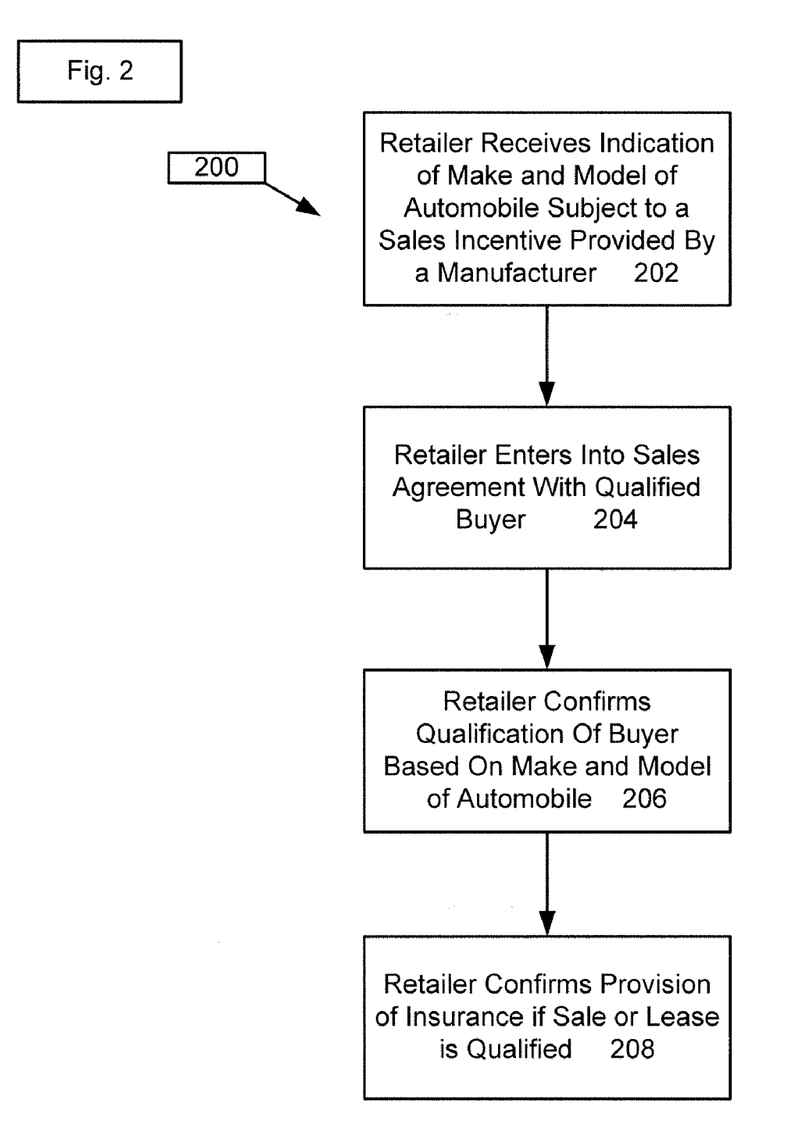
FIG. 2 is a flow chart of an exemplary process, performed by a retailer of an item, to provide a sales incentive for the purchase or lease of the item.

Turning now to FIG. 2, therein is depicted a process 200 by which a retailer may complete a sale of a qualified make and model of automobile to a qualified buyer. The process 200 begins when the retailer receives an indication of qualified makes and models according to the sales incentive program, as determined by the manufacturer 102 (step 202). The retailer may be provided with all the forms, manuals and guidelines required to successfully complete a sale or lease according to the program.

Next, the retailer may enter into a sale or lease transaction with a qualified buyer for a qualified automobile (step 204). The transaction may be embodied in one or more forms comprising a sales agreement for the lease or purchase of a vehicle in which the terms of the sale are incorporated. During performance of the sale or lease, the retailer may confirm that the purchaser/lessee qualifies for the sale or lease by, for example, referring to a credit report and further confirms that the make/model of the automobile is qualifies under the sales incentive program (step 206). The retailer then confirms the provision of an insurance policy having a term co-extensive with a financing period or a lease term associated with the sale or lease to the purchaser/lessee (step 208), after which process 200 ends.

Figure 3:
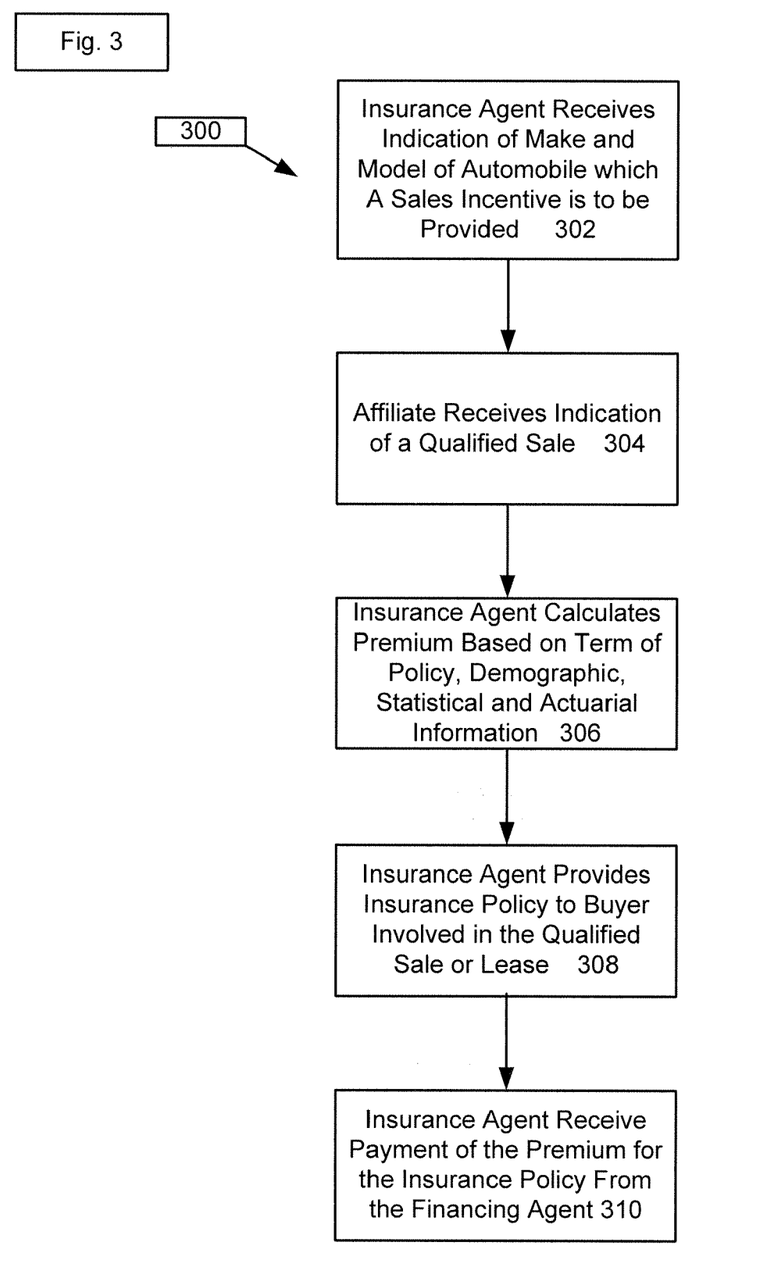
FIG. 3 is a flow chart of an exemplary process, performed by an insurance entity or affiliate, to provide an insurance policy corresponding to a sales incentive for the purchase or lease of an item sold by a manufacturer or retailer.

Referring now to FIG. 3, therein is depicted an exemplary process 300 performed by an insurer 104 for determining and providing an insurance policy according to the sales incentive program described above. The process 300 begins when the insurer 104 receives an indication of one or more makes and models of automobile for which the manufacturer 102 will provide the above-described sales incentive (step 302). Next, the insurer 104 may receive an indication of a qualified sale or lease under the program (step 304). The insurer 104 may then calculate a premium for an insurance policy to be provided to the purchaser/lessee using standard actuarial and statistical techniques and taking into account such factors as the age, sex, marital status, driving record, rating territory and the like (step 306).

The term of the insurance policy, being co-extensive with the length of a loan or lease, may have a multi-year term which represents a departure from standard billing practices of typical insurers. In common practice, an insurance policy is reviewed every six months or one year to re-evaluate the underwriting risks involved with an insured, and to recover changes in operating expenses or the like associated with maintaining a book of business. It is contemplated that a multi-year, non-changing premium can be advantageous nonetheless due to the provision of the payment of the entire multi-year premium up-front by the financing agent. The up-front payment may allow an insurer 104 to recoup lost opportunities to increase premiums by providing capital sufficient to generate investment returns and the like. The financing agent recovers the provision of the up-front premium payment by charging interest on the premium balance to the insured.

Continuing with process 300, the insurer 104 may then provide an insurance policy to the buyer at the time of sale or delivery of the vehicle (step 308), after which, the insurer 104 receives a payment of the premium from, for example, the financing agent on behalf of the buyer (step 310). The process 300 then ends.

Figure 4:
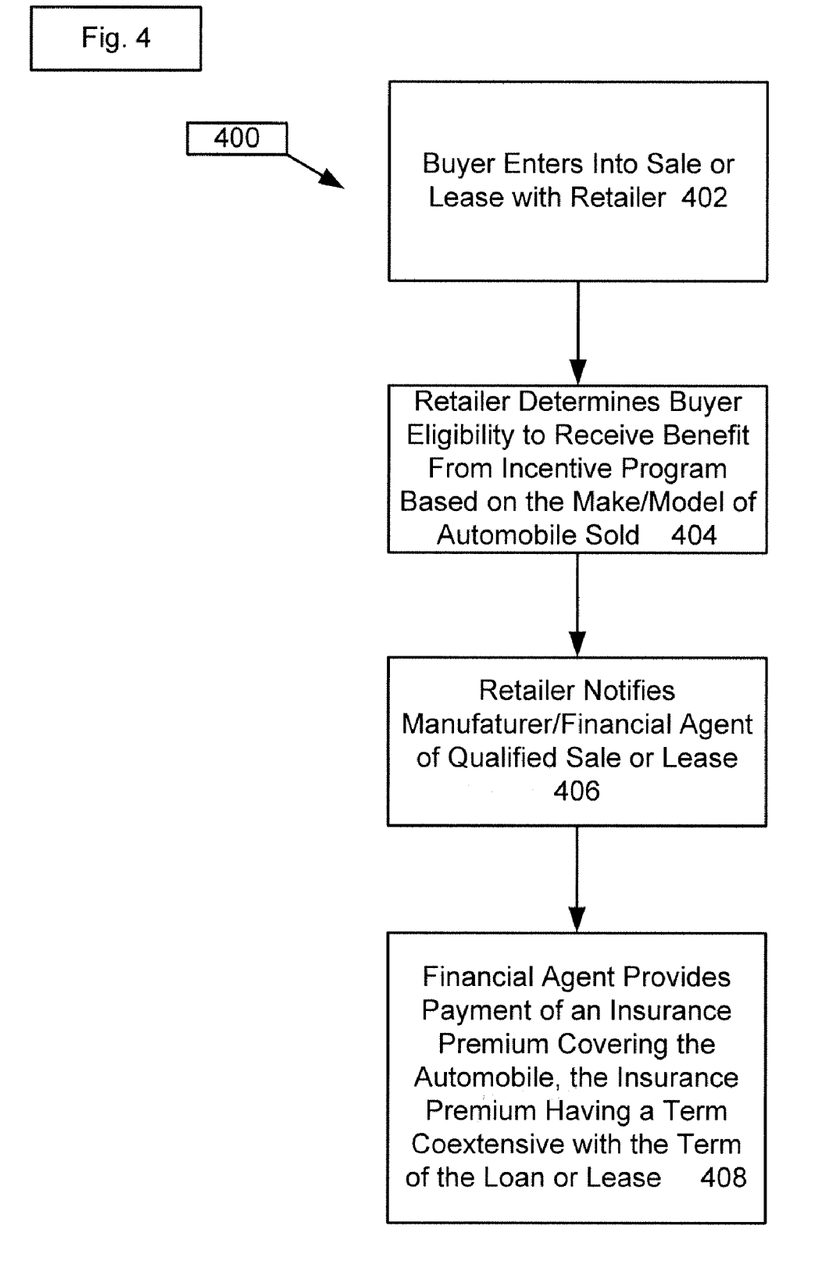
FIG. 4 is a flow chart of an exemplary process, performed by a buyer of an item, to receive an insurance policy with the purchase or lease of the item.

Turning now to FIG. 4, therein is depicted a process 400 by which a qualified buyer 100 receives an insurance policy with a sale or lease of a qualified automobile according to the sales incentive program described above. The process 400 begins at step 402 where the buyer enters into a sale or lease with, for example, a retailer authorized to sell or lease the qualified automobile. It is further contemplated that the sale or lease may be made by the manufacturer 102 directly. The retailer notifies the financial agent of the qualified sale (step 406). The financial agent then provides a payment of at least a portion of the insurance premium, or preferably, the entire insurance premium to the insurer 104 on behalf of the buyer 100 (step 408), thereby assisting the buyer in securing an insurance policy covering the automobile against certain types of losses. The process 400 then ends.

Figure 5:
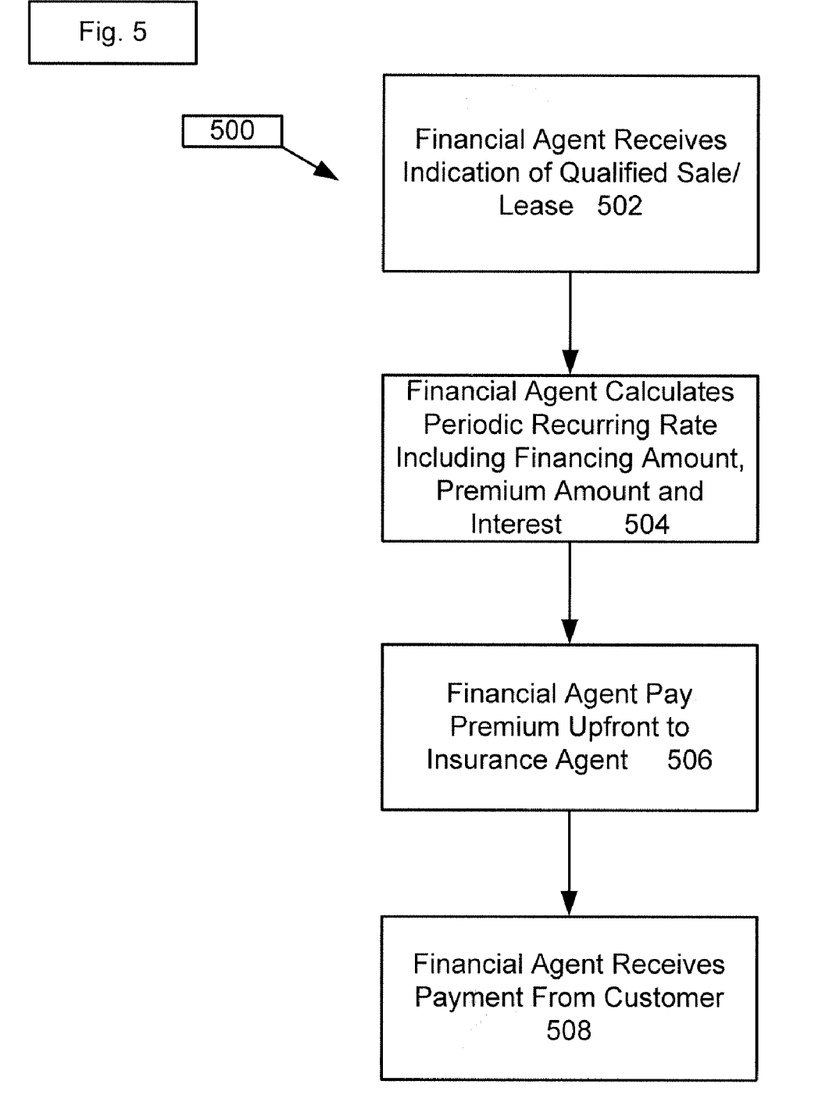
FIG. 5 is a flowchart of an exemplary process, performed by a financing agent to receive payment for the financed amount and the insurance premium.

Referring now to FIG. 5, an exemplary process 500 for receiving payments from a purchaser/lessee is depicted. At step 502, a financial agent receives an indication of a qualified sale or lease under the sales incentive program described above. Based on the terms of the sale and the insurance premium charged, the financial agent calculates a periodic recurring amount to be paid by the purchaser/lessee (step 504). The amount may include a portion of the financial balance for the automobile and a portion of the insurance premium. In addition, interest on both these amounts may be amortized in any known manner. The interest rate charged for the financed amount may be the same as the interest rate charged on the premium balance. Alternatively, the two interest rates may be different. The rates may also be fixed or variable as is known in the art.

Continuing with process 500, the financial agent pays the entire premium due to the insurer 104 (step 506). The financial agent then receives periodic payments corresponding to the calculated amount from the purchaser/lessee over the course of the loan or the lease (step 508). The process 500 then ends.

Figure 6:
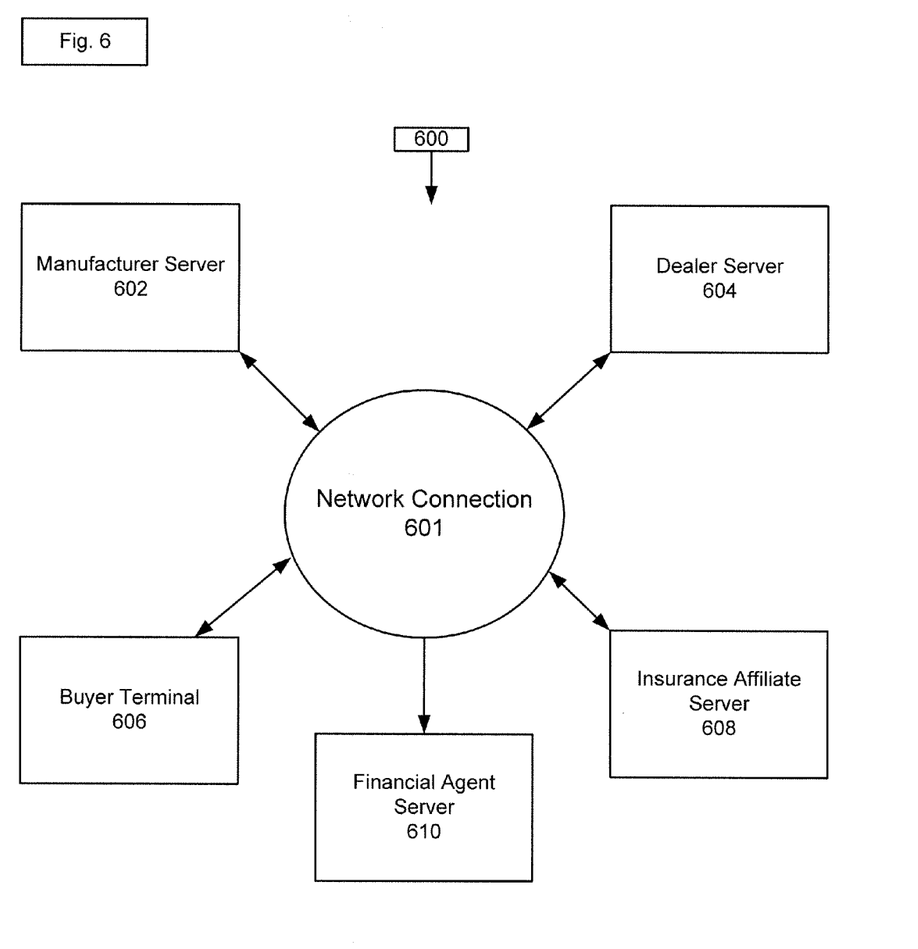
FIG. 6 is a block diagram representing an exemplary computer network for completing the provision of an insurance policy for an item sold to a buyer.

Turning to FIG. 6, it is contemplated that all the transactions described above may be implemented on a computer network 600 or series of such networks, such as the Internet or World Wide Web. In such an embodiment, the manufacturer 102 may have one or more computer servers 602 on the network 600 for providing information on available makes and models of automobiles, completing direct sales of such automobiles and completing such transactions in accordance with the sales incentive program described above. It is contemplated that one or more retailers may further have similar servers 604 on the network 600 for accomplishing the same, in addition to, or in lieu of, manufacturer servers 602.

The insurer 104 may operate an insurance affiliate server 608 for performing the steps described above with respect to FIG. 4. The affiliate server 608 may further handle insurance transactions directly with a buyer 100, such as processing claims, providing terms of insurance or handling buyer inquiries.

The financial agent may operate a financial agent server 610 for performing the steps described above with respect to FIG. 6.

The buyer 100 may communicate with the manufacturer server 602, the dealer server 604, the insurance affiliate server 608 and/or the financial agent server 610 using a buyer terminal 606 to complete a purchase of the automobile, receive the benefit of the sales incentive program, provide payments and communicate regarding the above-described insurance transactions.

Each of the servers 602, 604, 608 and 610 may be operative to communicate over the network 600 in any manner known in the art and are preferably operative to handle high-bandwidth communications from multiple buyers 100 simultaneously. The buyer terminal 606 may be any personal communications device operative to communicate over network 600, such as a personal computer with the ability to handle network communications, as well as, personal workstations, network terminals, personal digital assistants (PDAs), cellular telephone equipped with wireless internet access or any other similar hard-wired or wireless communications equipment.

In addition to the above features, there are several additional embodiments contemplated to be within the scope of the present invention. For example, it is contemplated that the provision of the insurance policy under the sales incentive program may be discounted or free to the buyer 100, as described above in co-pending related U.S. patent application Ser. No. 09/645,020 entitled "Insurance Incentive Program for Promoting the Purchase or Lease of an Automobile." However, if the buyer incurs substantial losses and/or significantly alters the underwriting exposure of the insurer with regard to the automobile and within a particular period of time, it is contemplated that an additional charge may be levied upon the buyer 100 to continue the insurance coverage. It is further contemplated that the term of the provided insurance may be substantially co-extensive with the term of the loan or lease secured by the purchaser/lessee or may be co-extensive with any portion thereof.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for billing a flat, recurring charge to a buyer for financing and insurance after a sale or lease of an item, comprising:
   receiving a first indication of a sale or lease of an item to a buyer;
   receiving a second indication of an insurance premium and a financial balance owed by the buyer corresponding to the sale or lease;
   receiving a third indication of a first time period in which a periodic payment is due, and a second time period in which the buyer must pay a financial balance corresponding to the item, the financial balance corresponding to a loan amount or a lease amount, and the second time period being greater than 1 year;
   calculating on a computer system a periodic recurring amount based on the insurance premium, the financial balance and the second time period; and
   receiving, from the buyer, a single payment corresponding to the periodic recurring amount within the first time period.

2. The method of claim 1, wherein the second time period is based on a length of a loan for the financial balance owed by the buyer.

3. The method of claim 1, wherein the second time period is based on a length of a lease for the item.

4. The method of claim 1, wherein the item is an automobile.

5. The method of claim 1, wherein the periodic, recurring amount is charged monthly.

6. The method of claim 1, further comprising:
   receiving a fourth indication of an interest rate to be applied to at least one of the financial balance and the insurance premium, wherein said calculating further includes:
   calculating the periodic recurring amount further based on the interest rate.

7. An apparatus for billing a flat, recurring charge to a buyer for financing and insurance after a sale or lease of an item, comprising:
   means for receiving a first indication of a sale or lease of an item to a buyer;
   means for receiving a second indication of an insurance premium and a financial balance owed by the buyer corresponding to the sale or lease;
   means for receiving a third indication of a first time period in which a periodic payment is due, and a second time period in which the buyer must pay a financial balance corresponding to the item, the financial balance corresponding to a loan amount or a lease amount, and the second time period being greater than 1 year;
   means for calculating on a computer system a periodic recurring amount based on the insurance premium, the financial balance and the second time period; and
   means for receiving, from the buyer, a single payment corresponding to the periodic recurring amount within the first time period.

8. An apparatus for billing a flat, recurring charge to a buyer for financing and insurance after a sale or lease of an item, comprising:
   a processor; and
   a memory in communication with the processor, the memory for storing a plurality of processing instructions enabling the processor to:
   receive a first indication of a sale or lease of an item to a buyer;
   receive a second indication of an insurance premium and a financial balance owed by the buyer corresponding to the sale or lease;
   receive a third indication of a first time period in which a periodic payment is due, and a second time period in which the buyer must pay a financial balance corresponding to the item, the financial balance corresponding to a loan amount or a lease amount, and the second time period being greater than 1 year;
   calculate a periodic recurring amount based on the insurance premium, the financial balance and the second time period; and
   receive, from the buyer, a single payment corresponding to the periodic recurring amount within the first time period.

9. A computer-readable medium encoded with processing instructions for implementing a method, performed by a computer, for billing a flat, recurring charge to a buyer for financing and insurance after a sale or lease of an item, comprising:
   receiving a first indication of a sale or lease of an item to a buyer;
   receiving a second indication of an insurance premium and a financial balance owed by the buyer corresponding to the sale or lease;

receiving a third indication of a first time period in which a periodic payment is due, and a second time period in which the buyer must pay a financial balance corresponding to the item, the financial balance corresponding to a loan amount or a lease amount, and the second time period being greater than 1 year;

calculating on a computer system a periodic recurring amount based on the insurance premium, the financial balance and the second time period; and receiving, from the buyer, a single payment corresponding to the periodic recurring amount within the first time period.

10. A method for determining a periodic payment for (1) a purchase or lease of an item and (2) an insurance premium for an insurance policy covering an item, comprising:

receiving a first indication of an item to be covered under an insurance policy;

receiving a second indication of a buyer of the item;

receiving a third indication of a first time period in which said periodic payment is due, and a second time period in which the buyer must pay a financial balance corresponding to the item, the financial balance corresponding to a loan amount or a lease amount, and the second time period being greater than 1 year; and calculating on a computer system an insurance premium for the second time period based on the item and the buyer; and calculating a periodic payment on a computer system to pay for the lease or sale of the item and the calculated insurance premium.

11. The method of claim 10, further comprising:

receiving, from a party other than the buyer, a payment of the insurance premium.

12. The method of claim 10, wherein the second time period is based on a length of a loan for the financial balance owed by the buyer.

13. The method of claim 10, wherein the second time period is based on a length of a lease for the item.

14. The method of claim 10, wherein the item is an automobile.

15. The method of claim 10, wherein the periodic, recurring amount is charged monthly.

16. The method of claim 10, further comprising:

receiving a fourth indication of an interest rate to be applied to at least one of the financial balance and the insurance premium, wherein said calculating further includes:

calculating the periodic recurring amount further based on the interest rate.

17. An apparatus for determining an insurance premium for an insurance policy covering an item, comprising:

means for receiving a first indication of an item to be covered under an insurance policy;

means for receiving a second indication of a buyer of the item;

means for receiving a third indication of a first time period in which a periodic payment is due, and a second time period in which the buyer must pay a financial balance corresponding to the item, the financial balance corresponding to a loan amount or a lease amount, and the second time period being greater than 1 year;

means for calculating on a computer system an insurance premium for the second time period based on the item and the buyer calculating on a computer system a periodic recurring amount based on the insurance premium, the financial balance and the second time period.

18. An apparatus for determining an insurance premium for an insurance policy covering an item, comprising:

a processor; and a memory in communication with the processor, the memory for storing a plurality of processing instructions enabling the processor to:

receive a first indication of an item to be covered under an insurance policy;

receive a second indication of a buyer of the item;

receive a third indication of a first time period in which a periodic payment is due, and a second time period in which the buyer must pay a financial balance corresponding to the item, the financial balance corresponding to a loan amount or a lease amount, and the second time period being greater than 1 year;

calculate an insurance premium for the second time period based on the item and the buyer calculating on a computer system a periodic recurring amount based on the insurance premium, the financial balance and the second time period.

19. A computer-readable medium encoded with processing instructions for implementing a method, performed by a computer, for determining an insurance premium for an insurance policy covering an item, the method comprising:

receiving a first indication of an item to be covered under an insurance policy;

receiving a second indication of a buyer of the item;

receiving a third indication of a first time period in which a periodic payment is due, and a second time period in which the buyer must pay a financial balance corresponding to the item, the financial balance corresponding to a loan amount or a lease amount, and the second time period being greater than 1 year;

calculating an insurance premium for the second time period based on the item and the buyer calculating on a computer system a periodic recurring amount based on the insurance premium, the financial balance and the second time period.

20. A processor-implemented method for coordinating payment comprising:

processing data on a computer system that is associated with a sale or lease of an item and a co-extensive insurance policy for the item;

calculating a buyer periodic payment on the computer system based on factors including:

an insurance premium associated with the co-extensive insurance policy;

a total outstanding balance associated with the total sale price or total lease amount of the item, a first period of time corresponding to the due date associated with an installment payment of the total outstanding balance, and a second period of time corresponding to the due date associated with paying off the total outstanding balance; and receiving a single payment corresponding to the buyer periodic payment amount within the first period of time.

21. A processor-implemented method for determining an providing insurance:

processing data on a computer system that is associated with a sale or lease of an item, a buyer or lessee of the item and a request for a co-extensive insurance policy for the item;

calculating an insurance premium on the computer system based on processed data including:

a total outstanding balance associated with the total sale price or total lease amount of the item, a first period of time corresponding to the due date associated with an installment payment of the total outstanding balance, and a second period of time corresponding to the due date associated with paying off the total outstanding balance; and calculating on a computer system a periodic recurring amount based on the insurance premium, the financial balance and the second time period determining a buyer periodic payment amount applied to paying a portion of the total outstanding balance and the calculated insurance premium.

* * * * *